United States Patent [19]

Streckert et al.

[11] Patent Number: 5,133,993
[45] Date of Patent: Jul. 28, 1992

[54] FIBER-REINFORCED REFRACTORY COMPOSITES

[75] Inventors: Holger H. Streckert, San Diego; Roko S. Bujas, Leucadia, both of Calif.

[73] Assignee: General Atomics, San Diego, Calif.

[21] Appl. No.: 569,929

[22] Filed: Aug. 20, 1990

[51] Int. Cl.$^5$ ............................................. B05D 3/02
[52] U.S. Cl. .................................. 427/226; 427/228; 427/379; 427/402
[58] Field of Search ................. 427/226, 228, 379, 402

[56] References Cited

U.S. PATENT DOCUMENTS

| | | | |
|---|---|---|---|
| 4,215,161 | 7/1980 | Siebold et al. | 427/228 |
| 4,267,211 | 5/1981 | Yajima et al. | 427/228 |
| 4,321,298 | 3/1982 | Shaffer et al. | 427/228 |
| 4,696,827 | 9/1987 | Okamura et al. | 427/228 |
| 4,749,631 | 6/1988 | Haluska et al. | 427/228 |
| 4,756,977 | 7/1988 | Haluska et al. | 427/228 |
| 4,772,516 | 9/1988 | Mahone | 427/228 |
| 4,892,790 | 1/1990 | Gray | 428/548 |
| 4,915,760 | 4/1990 | Singh et al. | 156/89 |
| 4,923,719 | 5/1990 | Kazrasek et al. | 427/387 |
| 4,946,713 | 8/1990 | Sneddon et al. | 427/228 |
| 5,024,979 | 6/1991 | Debaig-Valade et al. | 427/226 |

OTHER PUBLICATIONS

*Silicon Nitride from Organosilazane Cyclic and Linear Prepolymers* Journal of the Electrochemical Society, vol. 133, (14 pp.) 1986.

Primary Examiner—Janyce Bell
Attorney, Agent, or Firm—Fitch, Even, Tabin, & Flannery

[57] ABSTRACT

A method for preparing fiber-reinforced refractory composites is provided. A fibrous preform is infiltrated with at least two different refractory material precursors, then heated under conditions suitable to cure and pyrolyze the refractory precursors.

17 Claims, No Drawings

FIBER-REINFORCED REFRACTORY COMPOSITES

FIELD OF THE INVENTION

This invention relates to fiber-reinforced refractory composites, and methods for the preparation thereof.

BACKGROUND OF THE INVENTION

Fibrous composites are promising lightweight, high-strength materials which retain their strength at high temperatures. The fibers contribute high tensile strength and crack propagation resistance to the refractory matrix and should not be bonded strongly to the matrix.

Fibrous composites can be prepared in a variety of ways. One method involves infiltrating the reinforcing fibers, disposed in a woven fabric or the like, with refractory materials or precursors thereof. In order to obtain composites of desired dimensions for different applications, especially of a desired thickness, layers of such woven fabric are stacked one on another.

This then presents the problem of introducing a sufficient quantity of the refractory material (or precursor thereof) into the interstices of a preform, such as stacked layers of woven fabric, which will provide the reinforcing structure of the composite. If the various fiber groupings of the stacked layers of woven fabric could be substantially completely infiltrated with refractory material precursors, and if the size of the pores within the fibrous composites could be minimized so that the matrix would substantially completely fill the interstices of the fiber groupings, an article of high strength should result.

SUMMARY OF THE INVENTION

In accordance with the present invention, we have found that fiber-reinforced refractory composites can be prepared by treating a fibrous preform with precursors of at least two different refractory materials, and then heating the treated preform under conditions suitable to cure and pyrolyze the refractory precursors.

The resulting fiber-reinforced composites have excellent strength since the combination of materials employed is able to very effectively infiltrate the fiber groupings of the preform, allowing a composite to be produced having a high density and a low incidence of relatively small residual pores within the refractory matrix portion of the composite.

The inventive process can be accomplished employing less expensive equipment (and requiring less energy input) than is required for prior art methods, such as chemical vapor deposition. The treated article obtained in the practice of the present inventive process is frequently suitable for direct use in the desired application, i.e., without the need for any further modification, e.g., machining, or the like. As yet another benefit, articles obtained in the practice of the present invention can be further manipulated employing standard carbon-carbon processing techniques, without the need for any special handling.

DETAILED DESCRIPTION OF THE INVENTION

In accordance with the present invention, there is provided a method of preparing a fiber-reinforced composite having a refractory matrix, said method comprising:

a) infiltrating a fibrous preform with a first precursor-containing fluid to produce an infiltrated preform, b) heating said first infiltrated preform under conditions suitable to cure and pyrolyze the first precursor, thereby producing a pyrolyzed preform, c) infiltrating said pyrolyzed preform with a second precursor-containing fluid; wherein said second precursor is different than said first precursor; thereby producing a re-infiltrated preform, and thereafter d) heating said re-infiltrated preform under conditions suitable to cure and pyrolyze the second precursor, thereby producing a fiber-reinforced composite.

In accordance with another embodiment of the present invention, there is provided a method of preparing a fiber-reinforced composite having a refractory matrix, said method comprising:

a) infiltrating a fibrous preform with at least two different precursor-containing fluids or a mixture thereof, thereby producing an infiltrated preform, and thereafter b) heating said infiltrated preform under conditions suitable to cure and pyrolyze said precursors, thereby producing a fiber-reinforced composite.

The precursors contemplated for use in the practice of the present invention include substantially oxygen-free resins, which are cross-linkable at temperatures of about 200° C. or higher and certain monomers, which may be cyclic compounds. It is presently preferred that the first treatment cycle (i.e., infiltrating/heating of the preform) be carried out at a temperature in the range of about 200° C. up to 300° C. Thus, resins capable of cross-linking in this temperature range are desirable for use in the first treatment cycle.

Exemplary resins include polysilanes, polycarbosilanes, polycarbosilazanes, borazenes, borazanes, polysilazanes, organosilazanes, and the like.

Polycarbosilanes preferred for use in the practice of the present invention are resins that generally conform to the following generic structure:

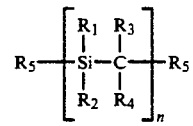

wherein each of $R_1$, $R_2$, $R_3$, $R_4$, and $R_5$ is independently selected from H, methyl, ethyl, propyl, phenyl, or vinyl groups and n falls in the range of about 10 up to 100. Generally, the precursors which are employed have lengths such that they may be referred to as prepolymers or resins. Such resins can be employed neat (if a liquid) or as a non-aqueous solution employing sufficient quantities of such solvents as acetone, toluene, xylene, lower alcohols, and the like, so as to achieve a viscosity between about 0.01 poise and 100 poise and preferably between about 0.02 and about 20 poise.

A variety of polycarbosilanes are commercially available which can be used in the practice of the present invention. Alternatively, several methods for the preparation of polycarbosilanes are well known to those of skill in this art, as, for example, in U.S. Pat. No. 4,497,787, the entire contents of which are herein incorporated by reference.

Polycarbosilazanes contemplated for use in the practice of the present invention generally conform to the following generic structure:

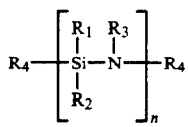

wherein each of $R_1$, $R_2$, $R_3$, and $R_4$ is independently selected from H, methyl, ethyl, propyl, phenyl, or vinyl groups; n falls in the range of about 2 up to 30; and wherein said resin can be employed neat (if a liquid) or as a non-aqueous solution employing sufficient quantities of such solvents as acetone, toluene, xylene, lower alcohols, and the like, so as to achieve a viscosity between about 0.01 poise and 100 poise and preferably between about 0.02 and about 20 poise.

A variety of polycarbosilazanes are commercially available and, as such, can be used in the practice of the present invention. Alternatively, several methods for the preparation of polycarbosilazanes are well known to those of skill in this art, as, for example, in U.S. Pat. No. 4,340,619, which is herein incorporated by reference in its entirety.

Borazenes useful in the practice of the present invention may generally have the following structure:

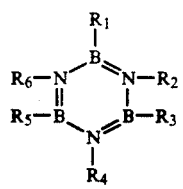

wherein each of $R_1$, $R_2$, $R_3$, $R_4$, $R_5$ and $R_6$ is independently selected from H, methyl, ethyl, propyl, phenyl, amino or vinyl. Polycyclic borazenes, such as $B_5N_5H_8$, as well as substituted derivatives thereof, can be used, as well as polymers (e.g. dimers, trimers, etc.) of borazenes. Moreover, cross-linked borazenes, particularly those where the cross-linkers are lower alkyl or —N(-H)— can also be used. Borazanes and substituted borazanes can also be used. These compounds can be employed neat (if a liquid) or as a non-aqueous solution employing sufficient quantities of a suitable solvent so as to achieve a viscosity in the range of about 0.01 poise and 100 poise and preferably between about 0.02 and about 20 poise.

Exemplary borazenes contemplated by the above structure include B-triamino-N-tris(trimethylsilyl) borazéne, and B-vinylborazenes. Others are disclosed in R. T. Paine and C. K. Navula "Synthetic Routes to Boron Nitride" *Chemical Reviews* 1990, Vol. 90, No. 1, 73-91 (1990).

Silazanes contemplated for use in the practice of the present invention are cyclic or acyclic monomeric species or can be polymers having the following general formula:

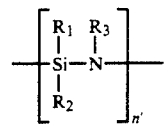

wherein each of $R_1$, $R_2$ and $R_3$ are independently as previously defined, and n' is between 2 and about 40. Cyclic monomers, such as, for example, 1,2,3,4,5,6-hexamethylcyclotrisilazane or 1,1,3,3,5,5-hexamethlycyclotrisilazane can be used. Exemplary acyclic silazanes include bis(dimethylamino)-methylsilane and the like.

The precursors employed in the practice of the present invention are typically brought into contact with the fibrous preform as the neat resin or as a solution in a suitable dispersing medium, such as, for example, carbon tetrachloride, chloroform, dichloromethane, toluene, tetrahydrofuran, dioxane, xylene, acetone, and the like. The concentration of precursor in the dispersing medium can vary widely. Concentration is typically chosen as a matter of convenience, with the amount of dispersing medium minimized to reduce the amount of diluent to be handled later, but with sufficient dispersing medium being employed to facilitate handling of the precursor.

Preforms contemplated for use in the practice of the present invention comprise a plurality of layers of a carbon cloth or ceramic fiber cloth, such as SiC (Nicalon), mullite (Nextel), $Si_3N_4$ (HPZ), and the like. Preforms employed in the practice of the present invention typically have a thickness in the range of about 0.03 up to 5 cm. Preforms can be unidirectional (1-D), two-dimensional fabric lay-ups (2-D), or three-dimensional architecturally woven or braided material (3-D).

It is presently preferred that the sequence of treating the preform with the first and second precursors be generally alternated so that the resulting composite material will benefit from the application of alternating layers of the refractory precursor materials. Optionally, one can treat the preform for two or more treating cycles with a first resin before treating the preform with the second resin.

It is presently preferred that the fibrous preform be infiltrated at least two times with the first precursor and at least two times with the second precursor. Although there is no maximum number of coating applications that can be used, more than about 12 cumulative coatings are not generally employed.

In certain instances it may be possible to contact the preform at the same time with a mixture of at least two different precursors, instead of sequential contacting with the different precursors. When this alternative embodiment is employed, the ratio of the resins can be varied widely, depending on the desired properties of the finished (cured) matrix.

In an optional embodiment of the present invention, a variety of additives can be incorporated into the resin materials. Additives such as oxidation inhibitors (e.g., submicron boron powder, zirconium boride powder, and the like); radar absorbing materials (e.g., carbonyl iron powder, cobalt powder, and the like); dielectric absorbers (e.g., silicon carbide whiskers) and so forth may be included.

Optionally, the fibrous preform can be treated with a wetting agent prior to initially contacting it with the precursor. A wetting agent, such as an aqueous solution of boric acid, may also be used prior to a subsequent step of infiltrating with the precursor; however, it may only be employed initially in most instances. Exemplary wetting agents include boric acid, decaborane, and the like.

The invention will now be described in greater detail with reference to the following non-limiting example.

EXAMPLE

A carbon fiber-reinforced composite having a silicon carbide/silicon nitride refractory matrix is prepared as follows:

Carbon fiber cloth is used which is purchased from Fiberite; the fabric is woven from tow comprising 3000 filaments per tow, each having a filament diameter of 7 µm and a density of 1.73 g/cm$^3$. The tow is obtained from Union Carbide (designated as T-300). The carbon fiber cloth is heat-treated at about 2100° C. for about one hour, so as to remove residual gases (primarily nitrogen) and is then treated with a 4% boric acid solution for about one to five minutes at room temperature; it is then preferably dried at 120° C. for about 30 minutes.

The treated fabric is then infiltrated with a commercially available polysilane solution (purchased from Union Carbide). The resin is referred to as Y-12044 polysilane resin and comprises a prepolymer in the form of a vinyl-derived polysilane resin having a C, H, Si and O$_2$ content of about 40-50% C, 8-10% H, 35-45% Si and <1.0% O$_2$; it has a polydispersity index in the range of about 6-9. Ten layers of the treated cloth are stacked; the assembly is then pressed to the desired thickness, and thereafter heated to first further cross-link the precursor (at about 250° C.) and then pyrolyze the polysilane to substantially convert it into silicon carbide at about 800° C.

The resulting preform is then treated with a commercially available polysilazane solution in the form of PS116 copolymer obtained from Petrarch Systems, Inc., Bristol, Pa., comprising a copolymer of 1,2 dimethyl silazane and 1-methyl silazane having the representative structure:

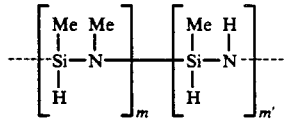

wherein m and m' are such that the polymer has a boiling point in the range of about 202°-206° C., a specific gravity of about 1.01, and a viscosity in the range of about 100-300 centistokes. The infiltrated/impregnated preform is then heated to a temperature sufficient to further cross-link the copolymer (about 300° C.) and pyrolyze the polysilazane to substantially convert it into silicon nitride (about 800° C.).

A second treatment with the polysilane prepolymer followed by curing and pyrolyzing is then effected.

The above overall procedure is repeated until an article having been treated a total of 12 times (with four repetitions of a polysilane-polysilazane-polysilane treatment sequence) is produced.

Material prepared as described above is compared with material prepared with the same T-300 carbon fiber cloth using infiltration employing only the Y-12044 polysilane precursor; the results are set forth below.

| Physical Properties | Polysilane Infiltration | Invention Infiltration (Polysilane/Silazane) |
|---|---|---|
| density, g/cm$^3$ | 1.7 | 1.7 |
| interlaminar shear, psi | 1,950 | 2,700 |
| flexural strength, psi | 24,000 | 28,300 |

The above results demonstrate that the inventive process produces a fiber-reinforced refractory composite having improved physical properties compared to a similar article prepared using prior art methods.

The invention has been described in detail with particular reference to preferred embodiments thereof, but it will be understood that variations and modifications can be effected within the spirit and scope of the invention.

Particular features are emphasized in the claims that follow.

What is claimed is:

1. A method of preparing a high-temperature-oxidation-resistant fiber-reinforced composite having a refractory matrix, said method comprising:
   a) infiltrating a fibrous preform with a first refractory precursor-containing fluid to produce an infiltrated preform, after first contacting said fibrous preform with an aqueous solution of a wetting agent selected from the group consisting of boric acid and decarborane, said first refractory precursor consisting essentially of a compound which upon pyrolysis forms silicon carbide, silicon nitride, or boron nitride;
   b) heating said infiltrated preform under conditions suitable to cure and pyrolyze the first refractory precursor, thereby producing a pyrolyzed preform,
   c) infiltrating said pyrolyzed preform with a second refractory precursor-containing fluid, said second precursor being different than said first precursor, to produce a re-infiltrated preform, said second refractory precursor consisting essentially of a compound which upon pyrolysis forms silicon carbide, silicon nitride, or boron nitride, and thereafter
   d) heating said re-infiltrated preform under conditions suitable to cure and pyrolyze the second refractory precursor, thereby producing a fiber-reinforced refractory matrix composite having good resistance to high-temperature oxidation.

2. A method according to claim 1 wherein said refractory precursor-containing fluids are selected from the group consisting of polysilane-containing fluids, polycarbosilane-containing solutions, polycarbosilazane-containing solutions, borazene-containing solutions, borazane-containing solutions, polysilazane-containing solutions, and organosilazane-containing solutions.

3. A method according to claim 1 wherein said first precursor-containing fluid is a polysilane-containing liquid, wherein said polysilane has the structure:

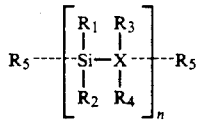

wherein X is C or O, each of $R_1$, $R_2$, $R_3$, $R_4$, and $R_5$ is independently selected from H, methyl, ethyl, propyl, phenyl or vinyl group; n falls in the range of about 10 to 100; and wherein said fluid is employed neat or as a non-aqueous solution having a viscosity in the range of about 0.01 to about 100 poise.

4. A method according to claim 1 wherein said second precursor-containing fluid is a polysilazane-containing liquid, wherein said polysilazane has the structure:

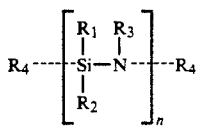

wherein each of $R_1$, $R_2$, $R_3$, and $R_4$ is independently selected from H, methyl, ethyl, propyl, phenyl or vinyl groups; n falls in the range of about 2 up to 50; and wherein said fluid is employed neat or as a non-aqueous solution having a viscosity in the range of about 0.01 to about 100 poise.

5. A method of preparing a high-temperature-oxidation-resistant fiber-reinforced composite having a refractory matrix, which method comprises the steps of:
  a) infiltrating a fibrous preform of fibers made from silicon carbide, silicon nitride, alumina, or mullite with a first refractory precursor-containing liquid, consisting essentially of at least one compound which upon pyrolysis forms a first refractory material which is silicon carbide, silicon nitride, or boron nitride, to produce an infiltrated preform;
  b) heating said infiltrated preform under conditions suitable to cure and pyrolyze the first refractory precursor and thereby produce a pyrolyzed preform;
  c) infiltrating said pyrolyzed preform with a second refractory precursor-containing liquid, which second refractory precursor is different from said first refractory precursor and consists essentially of at least one compound which upon pyrolysis forms a second refractory material which is different from said first refractory material but selected from the group consisting of silicon carbide, silicon nitride, and boron nitride, to produce a re-infiltrated preform;
  d) heating said re-infiltrated preform under conditions suitable to cure and pyrolyze the second refractory precursor; and
  then repeating steps a) to d) at least one more time to thereby produce a fiber-reinforced refractory matrix composite having good resistance to high-temperature oxidation.

6. A method according to claim 5 wherein said precursor-containing liquids are selected from polysilane-containing fluids, polycarbosilane-containing solutions, polycarbosilazane-containing solutions, borazene-containing solutions, borazane-containing solutions, polysilazane-containing solutions, and organosilazane-containing solutions.

7. A method according to claim 6 wherein said fibrous preform is contacted with an aqueous solution of a wetting agent prior to said infiltrating step a) so as to distribute said wetting agent upon along the exterior surfaces of the fibers of said fibrous preform.

8. A method according to claim 6 wherein said fibrous preform comprises multiple layers of two-dimensional woven cloth or a woven or braided three-dimensional array, and wherein said preform has a thickness in the range of about 0.03 cm. to about 5 cm.

9. A method according to claim 6 wherein said fibrous preform is coated at least 3 times with said first precursor and at least 3 times with said second precursor.

10. A method according to claim 9 wherein infiltration of said first precursor and infiltration with said second precursor are alternated.

11. A method according to claim 5 wherein said first precursor-containing liquid contains polysilane having the structure:

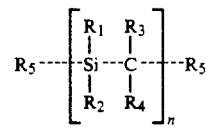

wherein each of $R_1$, $R_2$, $R_3$, $R_4$, and $R_5$ is independently selected from H, methyl, ethyl, propyl, phenyl or vinyl group; n falls in the range of about 10 to 100; and wherein said liquid is employed neat or as a non-aqueous solution having a viscosity in the range of about 0.01 to about 100 poise.

12. A method according to claim 5 wherein said second precursor contains polysilazane having the structure:

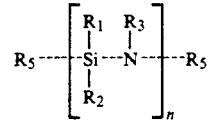

wherein each of $R_1$, $R_2$, $R_3$, and $R_4$ is independently selected from H, methyl, ethyl, propyl, phenyl or vinyl groups; n falls in the range of about 2 up to 50; and wherein said liquid is employed neat or as a non-aqueous solution having a viscosity in the range of about 0.01 to about 100 poise.

13. A method according to claim 5 wherein said first refractory precursor contains a polysilane resin which is substantially oxygen free and said second refractory precursor contains a polysilazane solution having a viscosity of between of about 100–300 centistokes, wherein following pyrolysis of said second precursor, another impregnation and pyrolysis step is carried out using said polysilane refractory precursor, and wherein said three steps of impregnating and pyrolyzing are repeated in that sequence at least four times.

14. A method according to claim 13 wherein said polysilane resin has an oxygen content of less than about 1 percent and is pyrolyzed to silicon carbide at a temperature of about 800° C.

15. A method according to claim 14 wherein said polysilazane resin is a co-polymer of 1,2-dimethylsilazane and 1-methylsilazane and is cured before being pyrolyzed to silicon nitride.

16. A method of preparing a high-temperature-oxidation-resistant fiber-reinforced composite having a refractory matrix, which method comprises the steps of:
   a) infiltrating a fibrous preform of fibers made from silicon carbide, silicon nitride, alumina or mullite to produce an infiltrated preform using a first refractory precursor-containing fluid consisting essentially of a cross-linkable polysilane which upon pyrolysis forms silicon carbide;
   b) heating said infiltrated preform under conditions suitable to cure said first refractory precursor, thereby producing a cured preform,
   c) infiltrating said cured preform with a second refractory precursor-containing fluid consisting essentially of a polysilazane, which upon pyrolysis forms silicon nitride, to produce a re-infiltrated preform;
   d) heating said re-infiltrated preform under conditions suitable to cure said second refractory precursor and then to simultaneously pyrolyze said first and second refractory precursors; and
   then repeating steps a) to d) at least one more time to thereby produce a fiber-reinforced refractory matrix composite having good resistance to high-temperature oxidation.

17. A method according to claim 16 wherein said fibrous preform is subjected to at least three of said infiltrating/heating cycles using two different precursors per cycle.

* * * * *